(No Model.)

H. W. RICHARDS.
AUGER.

No. 387,448.  Patented Aug. 7, 1888.

WITNESSES:
Phil C. Dieterich.
C. Sedgwick.

INVENTOR:
H. W. Richards,
BY Munn & Co.
ATTORNEYS.

UNITED STATES PATENT OFFICE.

HARRY W. RICHARDS, OF EDEN, FLORIDA.

AUGER.

SPECIFICATION forming part of Letters Patent No. 387,448, dated August 7, 1888.

Application filed December 29, 1887. Serial No. 259,312. (No model.)

*To all whom it may concern:*

Be it known that I, HARRY W. RICHARDS, of Eden, in the county of Brevard and State of Florida, have invented a new and Improved Auger, of which the following is a full, clear, and exact description.

This invention relates to an improvement in augers, and has for its object to provide an auger by means of which the edges of a hole may be cleaned after the hole has been bored. I accomplish this by means of one or more cutters so located on the auger that the boring will not be impeded and the edges of the hole may be trimmed after the hole is made.

Reference is to be had to the accompanying drawings, forming a part of this specification, in which similar figures of reference indicate corresponding parts in all the views.

Figure 1:
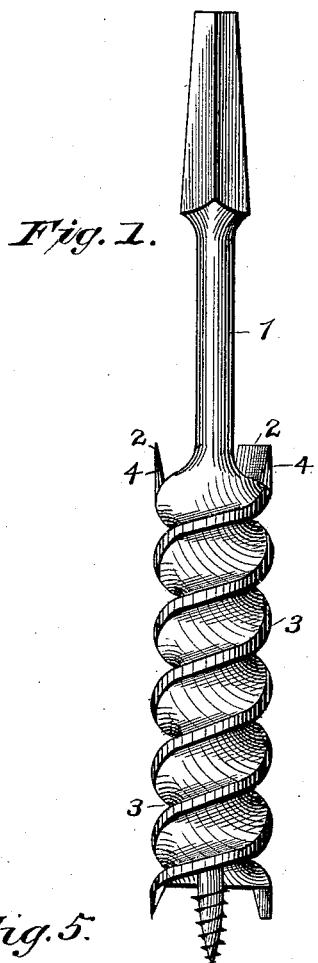
Figure 2:
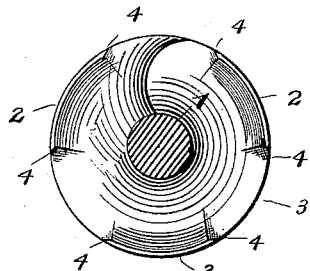
Figure 3:
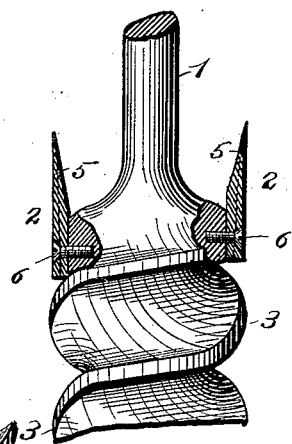
Figure 5:
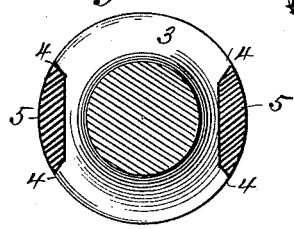
Figure 4:
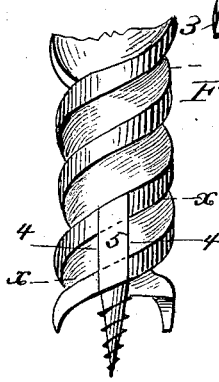

Figure 1 represents an auger-bit provided with the cutters for trimming the edges of a hole. Fig. 2 is a plan view thereof with shaft in section; and Fig. 3 is a modification with parts broken away and cutters in section, showing them detachable. Fig. 4 is a view showing the cutters extending from one edge of the spiral adjacent to the pod of the auger to the edge next above it. Fig. 5 is a horizontal section on line x x, Fig. 4.

When a hole is bored with an auger, the wood is more or less torn away at the edges, leaving them ragged. This is especially the case with a thin board. After the auger is withdrawn it is necessary to dress the rough and ragged edges of the hole with a separate tool.

In applying this invention any form of auger may be provided with one or more cutters, or augers may be made with the cutter or cutters integral therewith.

Referring to Fig. 1 of drawings, 1 indicates a common form of auger-bit made with cutters 2 at the upper end of the spiral and integral therewith. The cutters 2 are so located on the spiral 3 that they will be in the same vertical plane with the edge of the spiral and will not interfere with the operation of the auger. The cutters are formed with cutting-edges 4, which operate in a horizontal plane.

In the modification in Fig. 3 the cutters, instead of being integral with the auger-bit, are detachable, as shown by the cutters 5, secured to bit 1 by screws 6 or in any other suitable manner. By this means the cutters may be attached to any form of auger and replaced, if broken. Only one cutter may be employed, if preferred, or a number. Instead of locating them at the top of the bit they may be at the pod or in intermediate position between the pod and top of spiral. In the latter case the cutter would extend between two twists of the spiral.

In Fig. 4 the lower portion of an auger is shown, having a cutter, 5, formed integral therewith or detachable, if preferred, and extending from one edge of the spiral at its lower end to the edge next above it.

If desired, the cutters may be attached to the auger by dovetail joints and held therein by set-screws.

In the operation of the device, when a hole has been bored, the turning of the auger is continued, the cutters keeping clear of the hole until they come to the rough edge at the bottom of the hole, when a single turn with a lateral pressure causes the cutters to clear the rough edge.

Having thus described my invention, what I claim as new, and desire to secure by Letters Patent, is—

1. An auger provided with one or more cutters extending from the edge of the spiral parallel with the axis of the auger and in the same vertical plane with the outer edge of the spiral, substantially as described.

2. An auger provided with one or more detachable cutters extending from the edge of the spiral parallel with the axis of the auger and in the same plane with the outer edge of the spiral, substantially as described.

3. An auger provided with one or more cutters extending from the edge of the spiral adjacent to the pod of the auger to the edge of the spiral next above, the cutter or cutters being parallel with the axis of the auger and in the same plane with the outer edge of the spiral, substantially as described.

HARRY W. RICHARDS.

Witnesses:
W. S. NORWOOD,
A. A. STEWART.